United States Patent [19]

Lidorenko et al.

[11] Patent Number: 4,666,668
[45] Date of Patent: May 19, 1987

[54] GAS-PERMEABLE MEMBRANE, AND BLOOD OXYGENATOR BASED ON GAS-PERMEABLE MEMBRANE

[76] Inventors: Nikolai S. Lidorenko, ulitsa Kibalchicha, 2, korpus 1, kv. 217; Viktor T. Gorun, Streletskaya Ulitsa, 14, korpus 1, kv. 11; Grigory F. Muchnik, Preobrazhenskaya ploschad, 5/7, kv. 45; Zia R. Karichev, 1 ulitsa Mashinostroenia, 2/7, korpus 1, kv. 146; Alexandr N. Shteinberg, Veernaya ulitsa, 7, kv. 130, all of Moscow; Mikhail B. Lev, Aptechnaya ulitsa, 3, kv. 46, Khimki; Viktor I. Moiseev, 3 Mytischinskaya ulitsa, 14, kv. 74, Moscow; Igor S. Schegolev, Bolotnikovskaya ulitsa, 51, kv. 135, korpus 1, Moscow; Vladimir M. Ilin, ulitsa Lavochkina, 52, kv. 279, Moscow; Igor I. Smirnov, Dnepropetrovskaya ulitsa, 3, korpus 3, kv. 50, Moscow, all of U.S.S.R.

[21] Appl. No.: 843,834
[22] Filed: Mar. 26, 1986

Related U.S. Application Data

[63] Continuation of Ser. No. 633,679, Jul. 25, 1984, abandoned, which is a continuation of Ser. No. 532,822, Sep. 16, 1983, abandoned, which is a continuation of Ser. No. 253,835, filed as PCT/SU79/00070, Aug. 21, 1979, published as WO81/00522, Mar. 5, 1981, abandoned.

[51] Int. Cl.$^4$ .................. A61M 1/14; B01D 13/00; B32B 9/04; B32B 15/04
[52] U.S. Cl. .................. 422/48; 210/321.3; 210/321.4; 210/506; 210/510.1; 428/447; 428/450
[58] Field of Search .......... 422/48; 210/321.3, 321.4, 210/506, 510.1; 428/215, 447, 450

[56] References Cited

U.S. PATENT DOCUMENTS

| | | | |
|---|---|---|---|
| 3,325,330 | 6/1967 | Robb | 156/229 |
| 3,413,095 | 11/1968 | Bramson | 422/48 X |
| 3,459,310 | 8/1969 | Edwards | 422/48 X |
| 3,684,097 | 8/1972 | Mathewson, Jr. et al. | 210/321.3 |
| 3,724,673 | 4/1973 | Ryon | 422/48 X |
| 4,214,020 | 7/1980 | Ward et al. | 422/48 X |
| 4,243,701 | 1/1981 | Riley et al. | 55/158 X |
| 4,329,157 | 5/1982 | Dobo et al. | 55/16 |

FOREIGN PATENT DOCUMENTS

| | | | |
|---|---|---|---|
| 2409781 | 11/1978 | France . | |
| 0004283 | 1/1979 | Japan | 210/506 |
| 2011804 | 7/1979 | United Kingdom . | |
| 0657822 | 4/1979 | U.S.S.R. | 422/48 |

OTHER PUBLICATIONS

Extracorporeal Circulation, Dr. J. Garrott Allen, pp. 81–100, 1958.
Transactions American Society for Artificial Internal Organs, vol. XIV, pp. 328–334, 1968.
USSR Inventor's Certificate No. 657,822, published Apr. 25, 1979.

*Primary Examiner*—Barry S. Richman
*Assistant Examiner*—Lynn N. Kummert
*Attorney, Agent, or Firm*—Fleit, Jacobson, Cohn & Price

[57] ABSTRACT

The gas-permeable membrane comprises a reinforcing substrate (2) and a continuous layer (1), deposited thereonto, of a polymer based on an organosilicon rubber. The substrate (2) is made of a solid open-pore material. The layer (1) has a thickness of from 2 to 5 μm and partly fills pores (3). The process for the manufacture of the gas-permeable membrane comprises preparation of a 1–20% solution of a polymer based on an organosilicon rubber in a solvent inert relative to the solid porous substrate material and capable of wetting it. The substrate is heated to a temperature by 0.5°–20° C. above the boiling point of the solvent and the polymer solution is sprayed onto the substrate surface in an amount of from 0.5 to 5 mg/cm$^2$. The blood oxygenator comprises a plurality of rigid gas-permeable membranes (13) positioned one above another in a housing (17). The membranes (13) are connected in pairs along their periphery and along the circumference of the central openings with the formation of gas-flow chambers (15) with the polymer layer on their external surfaces. The blood-flow chambers (14) are formed in clearances between projections (19) on external surfaces of the gas-flow chambers (15). Inside the central openings of membranes (13) an inlet central blood-flow manifold (16) is formed.

10 Claims, 5 Drawing Figures

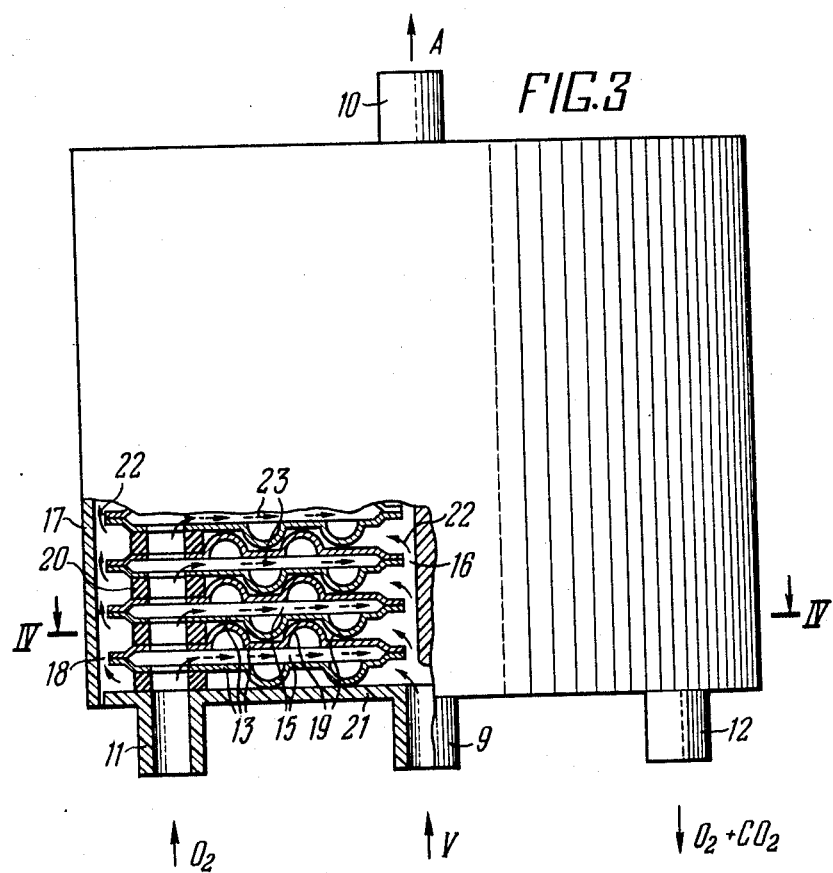

GAS-PERMEABLE MEMBRANE, AND BLOOD OXYGENATOR BASED ON GAS-PERMEABLE MEMBRANE

This application is a continuation of application Ser. No. 633,679, filed July 25, 1984, now abandoned, which is a file wrapper continuation application of Ser. No. 532,822, filed Sept. 16, 1983, now abandoned, which is a file wrapper continuation of Ser. No. 253,835, filed as PCT/S679/00070, Aug. 21, 1979, published as W081/00522, Mar. 5, 1981, now abandoned.

FIELD OF THE INVENTION

The present invention relates to the art of medicinal instrumentation and, more specifically, to the design of gas-permeable membranes, process for manufacturing same and blood oxygenator based on such membranes.

BACKGROUND OF THE INVENTION

Two requirements should be set in providing a highly-efficient gas-exchange apparatus. First of all, a gas-permeable membrane possessing high specific characteristics is required. Secondly, on the basis of this membrane, a design should be provided which has the effect of providing uniform distribution of all the media, effective intermixing, and provides an adequate gas exchange over the entire working surface area of the membrane.

Gas membranes employed in blood oxygenators should have a high permeability with respect to $O_2$, and still higher permeability relative to $CO_2$, biological compatibility with blood and sufficient mechanical strength to withstand pressures encountered during operation.

Known in the art are gas-permeable membranes made from polymeric materials: polyethylene, polytetrafluoroethylene (Teflon), polyvinylchloride, natural rubber, dimethylsilicon rubber.

Gas-permeability of membranes made from polymeric materials is a function of gas dissolution properties of a membrane and the diffusion properties of the gas. Therefore, gas-permeability P is a product of solubility S and diffusion coefficient D:

$$P = S \cdot D$$

All the above-mentioned membranes of polymeric materials are biologically compatible with blood, but substantially differ from each other in permeability. Thus, the coefficient of permeability of oxygen $P_{O_2} \times 10^{-9}$ for the following substances is equal to:
- polyethylene: 0.0002
- polytetrafluoroethylene: 0.0004
- polyvinylchloride: 0.014
- natural rubber: 2.4
- dimethylsilicon rubber: 50.0.

$CO_2$-Permeability for dimethylsilicon rubber is about 5 times higher than $O_2$-permeability, and for membranes made from other materials this ratio is even higher.

In the first models of blood oxygenators, comprising a housing partitioned by means of a gas-permeable membrane into a blood flow chamber, and gas flow chamber polyethylene films were employed as gas-permeable membranes (cf. J. Close, Nevill "Membrane Oxygenator" in Coll. "Artificial Blood Circulation" ed. By J. Allen, Medgiz Publishing House, 1960, pp. 78–96). Such an oxygenator, to ensure a full-fledged artificial blood circulation, has a gas-exchange surface of 32 $m^2$ and a capacity of 5.75 l for donor's blood. It has been found that during operation, membranes are covered by depositions and lose the property of non-wettability, thus causing penetration of the liquid into the gas chambers. This limits the time of useful operation of the oxygenator to 2-3 hours.

It has seen from the foregoing that the use of a gas-permeable membrane with a low gas-permeability in blood oxygenators necessitates development of a gas-exchange surface of several dozens of square meters and, consequently, a big (up to 6 liters) volume of donor's blood. Furthermore, such membranes exert a detrimental effect on blood and this limits the time of their use.

For this reason attempts have been made to use, as the material for gas-permeation membranes, dimethylsilicon rubber which has a good gas-permeability and a high biocompatibility. However, pure dimethylsilicon rubber has a low mechanical strength and films with a thickness of only above 100 $\mu m$ can be obtained therefrom, macrodefects (holes) are frequently formed in such films.

To increase the mechanical strength of the polymer, organosilicon rubber polymers, silicon rubber in particular, application of a nylon fabric was suggested (reinforcing substrate) to obtain reinforced films with a thickness of 125 $\mu m$ (T. Kolobow, W. Zapol, J. E. Pierce, A. F. Keely, R. L. Replogle and A. Haller "Partial extracorporeal gas exchange in alert new born lambs with a membrane artificial lung perfused via an A-V shunt for periods up to 96 hours", vol. XIV Trans. Amer. Soc. Artif. Int. Organs, 1968, p. 328–334).

The known process for the production of such gas-permeable membranes is to apply silicon rubber onto a reinforcing substrate by casting, followed by rolling of the applied rubber together with the substrate between rolls to create a membrane of uniform-thickness (cf. U.S. Pat. No. 3,325,330 published June 13, 1967). The rubber layer in such membrane fully fills the reinforcing network.

The use of gas-permeable membranes based on silicon rubber has made it possible to produce blood oxygenators for total artificial blood circulation with a working surface of about 6 $m^2$ and a volume of about 1 liter. However, membranes in these oxygenators have a substantial thickness (125 $\mu m$) which is determined by the thickness of the reinforcing screen.

It is known that at a constant permeability coefficient the amount of gas passed through the membrane is inversely proportional to its thickness. Therefore, there is a limitation on the amount of gas passed through the membrane. Furthermore, at the sites of bonding of rubber with the reinforcing screen fibers an insufficient adherence can take place which results in the formation of macroholes and, shutdown of the blood oxygenator.

Most convenient at the present time is the design wherein a plurality of gas-permeable membranes having a central orifice separate alternating blood flow chambers from gas flow chambers. To ensure the blood flow through all of the chambers, the oxygenator is provided with the central inlet and peripheral outlet manifolds; for the gas there are also provided the inlet and outlet gas manifolds. All the membranes have a total working surface sufficient for full artificial blood circulation. Since all currently known gas-permeable membranes employed in blood oxygenators are flexible, to practice such arrangement, it is necessary to use spacing members positioned between the membranes and comprising, as a rule, a rigid grate structures. These members also serve to ensure constancy of the cross-section of the blood flow. However, the use of additional members being in contact with blood exerts a detrimental effect on blood.

DISCLOSURE OF THE INVENTION

The present invention relates to a gas-permeation membrane which would be capable of passing, through its unit surface area, substantially greater amounts of gas than all known similar-type membranes and would have rigidity which enables withstanding of the originated loads without changing its shape set during its manufacture, and provides a process for producing the gas-permeable membrane and a design of a blood oxygenator based on this gas-permeable membrane having a smaller gas-exchange surface area and, consequently, requires a lesser volume of donor's blood, and has a minimum effect on blood which has the regeneration abilities of a living organism, thus facilitating the progress of the post-operation period in patients and enabling an enlarged field of application of blood oxygenators not only to artificial blood circulation, but to the maintenance of breathing in cases of pulmonary insufficiency.

This object is accomplished by providing a gas-permeable membrane comprising a reinforcing substrate and a polymer layer based on an organosilicon rubber. In accordance with the present invention, the reinforcing substrate is made of a solid material with open porosity, the polymer layer deposited onto the substrate has a thickness of from 2 to 5 $\mu$m and partly fills pores to a depth between about five percent and about eight percent of the thickness of the substrate which is sufficient for reliable adherence of the solid layer of the polymer to the surface of the substrate.

It is advisable to make the reinforcing substrate from a sintered metal powder.

The object of the present invention is also accomplished in the process for the manufacture of such a membrane comprising application of a polymer layer based on an organosilicon rubber onto a reinforcing substrate. In accordance with the present invention, the substrate used is made of a solid open-pore material, and application of the polymer layer thereonto is effected by dissolving the polymer in a concentration of from 1 to 20% in a solvent inert to the substrate material and capable of wetting it; heating the substrate to a temperature by 0.5°–20° C. above the boiling temperature of the solvent and spraying the polymer solution based on the organosilicon rubber onto the substrate surface in an amount of from 0.5 to 5 mg/cm$^2$ is preferred.

The object of the present invention is also accomplished by providing a blood oxygenator comprising a housing, partitioned by a gas-permeable membrane into a blood-flow chamber and a gas-flow chamber. According to the present invention, the gas-permeable membrane used in the blood oxygenator is made from the gas-permeable membrane material produced according to the present invention.

In this case, it is advisable that in a blood oxygenator containing a plurality of such membranes, having a central opening and separating alternating blood-flow chambers from gas-flow chambers, a central inlet and peripheral outlet blood-flow manifolds, as well as an inlet and outlet gas manifolds, that the membranes be positioned so that their identified surfaces face each other and are connected in pairs along the periphery and circumference of the central openings. This permits the formation of membrane chambers for using gas flow projections positioned on the gas flow polymer layers on their external surfaces. Said projections are positioned so that the projections from one identical surface is placed to be between the projections of the other surface. Clearances between the side surfaces of the projections provides blood-flow chambers inside the central openings of the membranes. An inlet central blood-flow manifold is similarly formed.

It is desirable to place a sealing partition in the central manifold at approximately half length thereof so that the parts of the central manifold positioned on both sides of the partition are communicating by means of an annular peripheral manifold.

It is also advisable that in the central manifold, on both sides of the partition, displacing members be provided to reduce the blood volume in the oxygenator and uniformly distribute blood in the blood-flow chambers.

The gas-permeable membrane arranged according to the present invention has a higher gas-permeability than all similar known membranes due to a reduced thickness of the polymer layer which is one of the main diffusion resistance factors defining the efficiency of gas exchange of membranes of this type. At the same time, this thinner continuous polymer layer does not undergo any mechanical loads originating in operation, since it is rigidly secured to the robust high-pore reinforcing substrate bearing the originating forces. Owing thereto, the geometrical shape of the substrate and, hence, of the membrane as a whole is retained.

The process for the manufacture of a gas-permeable membrane according to the present invention is simple and necessitates no novel sophisticated process equipment. It is sufficient to use a heater with a predetermined constant temperature and a sprayer for the polymer solution. Such heaters and sprayers are readily available from various manufacturers in all developed countries of the world.

The gas-permeable membranes according to the present invention can be used in different gas-exchange apparatus, but it is most advantageous to use them in blood oxygenators.

The arrangement of a blood oxygenator making use of the membrane according to the present invention features a smaller gas-exchange surface area necessary for oxygenation of the given blood flow and, consequently, with lesser volume of the donor blood employed. Furthermore, the rigid reinforcing substrate makes it possible to impart the required shape to the membrane so as to form alternating blood-flow chambers and gas-flow chambers. The polymer layer on the membrane faces the blood-flow chambers. Therefore, blood is in contact with the polymer having the best possible biological compatibility therewith. This causes a minimum effect by the oxygenator on the patient's blood, thus facilitating the progress of the post-operation period and providing for a broadened range of application of oxygenators not only to artificial blood circulation, but to maintenance of breathing in cases of pulmonary insufficiency as well.

The gas-permeable membranes according to the present invention have good processibility characteristics, making it possible to impart any desirable rigid configuration thereto. In particular, the gas permeable membranes can be connected in pairs and projections can be added thereon. The projections on the membranes ensure constancy of the blood-flow chamber size and uniformity of distribution of the blood flow between individual chambers. Furthermore, while moving between the projections, the blood is continuously intermixed in the course of its laminar flow. This, in turn, improves the operation efficiency of such gas-exchange apparatus.

The projections on the membranes make it possible to avoid the use of spacing members (screens) in the blood-flow chambers, thus lowering the hydraulic resistance of the blood-flow chambers. This makes it possible to use the blood oxygenator, for instance, in maintenance of breathing without a pump. Therefore, movable parts are eliminated from the blood circulation circuit, thus minimizing damage of the elements of blood.

BRIEF DESCRIPTION OF THE DRAWINGS

The present invention is further explained by the description of particular embodiments thereof with reference to the accompanying drawings, wherein:

FIG. 3 is a blood oxygenator having a plurality of membranes shown in FIG. 1;

BEST MODE FOR CARRYING-OUT THE INVENTION

Figure 1:
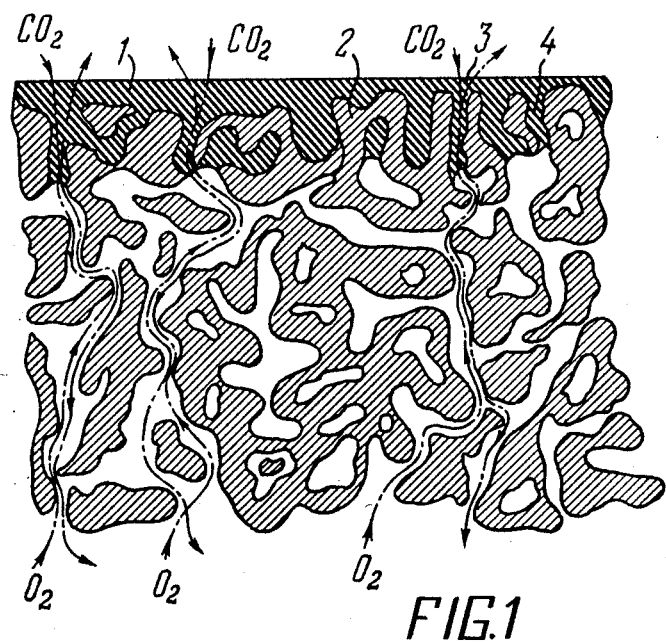
FIG. 1 is a cross-section view of a gas-permeable membrane produced by the process according to the present invention.

The main member of the gas-permeable membrane according to the present invention is a continuous layer 1 (FIG. 1) of a polymer based on organosilicon rubber. This layer 1 with a thickness of 2 to 5 μm is applied onto a reinforcing substrate 2 having open pores 3 which are partly filled, on the side of the continuous layer 1, with the organosilicon rubber-based polymer. The inner surface of pores 3 has a rough surface of a sophisticated configuration, wherefore this partial filling 4 of pores 3 with the polymer ensures a durable bonding between the continuous polymer layer 1 and porous substrate 2. The polymer (filling 4) located on pores 3 of substrate 2 and the polymer forming the continuous layer 1 have the same nature and a large contact area. This ensures a reliable adherence of the continuous polymer layer 1 to the surface of the substrate 2.

The reinforcing substrate 2 can be made of any solid material with an open-pore content of above 20% having a sufficient mechanical strength and possessing gas-permeability exceeding by more than 100 times that of the polymer layer 1 applied onto the substrate.

The reinforcing substrate can be made, for example, of a sintered nickel powder and have the following characteristics:
  open-pore content: 60%
  thickness: 150 μm
  maximum pore size: 3 μm
  average pore size: 1 μm
  permeability relative to oxygen:

$$(2.5-3.5) \times 10^{-3} \frac{cm^3}{sec \cdot mm\ H_2O \cdot cm^2}$$

The porous reinforcing substrate can be also made of ethylcellulose and have the following characteristics:
  open-pore content: 10%
  thickness: 160 μm
  maximum pore size: 3.5 μm
  average pore size: 1.5 μm
  permeability relative to oxygen:

$$(1.5-3.0) \times 10^{-3} \frac{cm^3}{sec \cdot mm\ H_2O \cdot cm^2}$$

The gas-permeable membrane according to the present invention is manufactured by applying, onto a reinforcing substrate 2, a layer 1 of a polymer based on an organosilicon rubber. The application of the polymer layer 1 is effected by dissolving the polymer in a concentration of 1 to 20% in a solvent which is inert to the substrate material 2 and capable of wetting it. Then the substrate 2 is heated to a temperature by 0.5°-20° C. above the boiling point of the solvent and the organosilicon rubber polymer solution is sprayed onto the substrate surface 2 in an amount of from 0.5 to 5 mg/cm$^2$.

When the solution aerosol falls onto the hydrophylic reinforcing substrate 2, the solution is drawn, by the capillary forces, into pores 3 of the heated substrate 2. The solvent boils and completely evaporates, while the polymer remains inside pores 3 of the reinforcing substrate 2 at a depth of 8 to 12 μm. At subsequent spraying cycles of the solution these pores 3 are filled with the polymer from the above-mentioned depth up to the surface of the substrate 2, whereafter a further spraying creates on the surface of the reinforcing substrate 2 a continuous layer 1 of the polymer with a thickness of from 2 to 5 μm bonded with the polymer located inside pores 3.

Since the cross-section of pores 3 is variable and their inside surface is rough, the polymer (filling 4) has a strong mechanical bonding with the substrate 2 and ensures a reliable adherence of the continuous layer 1 to the surface of the substrate 2.

For a better understanding of the process for the manufacture of a gas-permeable membrane according to the present invention some specific examples are given hereinbelow by way of illustration.

EXAMPLE 1

A 20% solution of dimethylsilicon rubber in gasoline is prepared. The employed gasoline should be colourless, transparent, without tetraethyl lead, mechanical impurities or water. The thus-prepared solution is sprayed onto a heated reinforcing substrate from a sintered nickel powder to a thickness of 150 μm. The substrate temperature is maintained constant and equal to 140° C. When the solution aerosol contacts the hydrophylic porous substrate, it is drawn inside the pores of the substrate under the action of capillary forces; gasoline boils and fully evaporates and the rubber remains at the depth of 8–10 μm. In the subsequent spraying the pores are fully filled with the rubber to this depth, whereafter a further spraying of the solution creates a continuous layer of rubber of a thickness of 4–5 μm on the reinforcing substrate.

EXAMPLE 2

A 1% solution of dimethylsilicon rubber in gasoline is prepared. The employed gasoline should be transparent, colourless, containing no tetraethyl lead, mechanical impurities or water. The resulting solution is sprayed onto a heated reinforcing substrate from a sintered nickel powder with the thickness of 150 μm. The substrate temperature is maintained constant and equal to 120.5° C. When the solution aerosol contacts the hydrophylic reinforcing substrate, it is drawn inside the substrate pores by capillary forces; gasoline boils and fully evaporates, while the rubber remains at a depth of 10–12 μm. In further spraying the pores are fully filled with the rubber to this depth, whereafter a further spraying of the solution creates a continuous layer of the rubber with a thickness of 2–3 μm on the reinforcing substrate.

EXAMPLE 3

A 5% solution of dimethylsilicon rubber is gasoline is prepared. The employed gasoline should be transparent, colourless, containing no tetraethyl lead, mechanical impurities or water. The thus-prepared solution is sprayed onto a heated reinforcing substrate from a sintered nickel powder with the thickness of 150 μm. The substrate temperature is maintained constant and equal to 125° C. When the solution aerosol contacts the hydrophilic porous substrate, it is drawn inside pores by capillary forces; gasoline boils and fully evaporates, while the rubber remains at a depth of 9–10 μm. In the subsequent spraying pores are fully filled with rubber to this depth, whereafter a further spraying of the solution creates a continuous layer of rubber of a thickness 3–4 μm on the reinforcing substrate.

EXAMPLE 4

To 10% solution of dimethylsilicon rubber in diethyl ether is prepared. The resulting solution is sprayed onto a heated reinforcing substrate of a sintered nickel powder of the thickness of 150 μm. The substrate temperature is maintained constant and equal to 50° C. When the solution aerosol contacts the porous hydrophilic substrate, it is drawn inside pores by capillary forces; ether boils and fully evaporates and the rubber remains at a depth of 8 to 10 μm. In subsequent spraying pores are fully filled with rubber, whereafter a further spraying of the solution creates a continuous layer of rubber with a thickness of 4–5 μm on the reinforcing substrate.

EXAMPLE 5

A 8% solution of silane in chloroform is prepared. The resulting solution is sprayed onto a heated reinforcing porous substrate of ethylcellulose with the thickness of 160 μm. The substrate temperature is maintained constant and equal to 80° C. When the aerosol solution contacts the hydrophylic porous substrate, it is drawn by capillary forces inside the substrate pores; chloroform boils and fully evaporates, while silane remains at a depth of 8–10 μm. In subsequent spraying pores are fully filled with silane to this depth, whereafter a further spraying of the solution creates a continuous layer of silane with a thickness of 4–5 μm on the reinforcing substrate.

Figure 2:
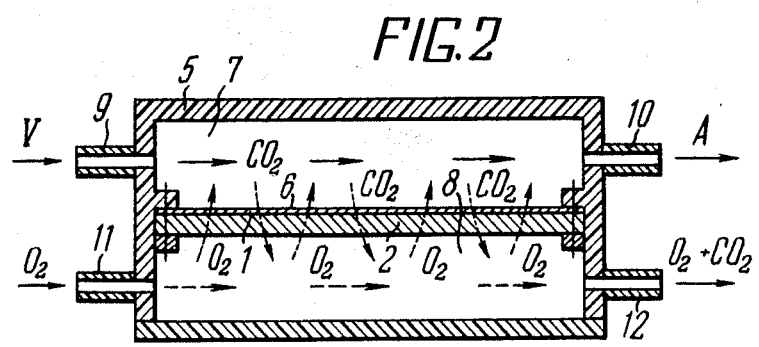
FIG. 2 is a schematic view of a simplest embodiment of the blood oxygenator with the gas-permeable membrane shown in FIG. 1.

In FIG. 2 schematically shown is a simple-type blood oxygenator comprising a housing 5 partitioned by a gas-permeable membrane 6 according to the present invention as shown in FIG. 1 into a blood-flow chamber 7 and a gas-flow chamber 8. In the housing 5 there is an inlet pipe 9 for venous blood and an outlet pipe 10 for arterialized blood, as well as pipes 11 and 12 for inlet and outlet of gas respectively. The gas-permeable membrane 6 is positioned so that the continuous layer 1 of the polymer on the reinforcing substrate 2 is facing the blood-flow chamber 7.

In FIG. 3 there is schematically shown the arrangement of a blood oxygenator comprising a plurality of gas-permeable membranes 13 positioned parallel to each other and having the design shown in FIG. 1.

Membranes 13 are made as discs with a central opening; they separate alternating blood-flow chambers 14 from gas-flow chambers 15. Membranes 13 are connected in pairs along their periphery and the circumference of the central openings which form a central inlet blood manifold 16. Between the outer edges of membranes 13 and the housing 17 of the manifold there is an annular peripheral outlet blood-flow manifold 18. On the external side surfaces of membranes 13 projections 19 are positioned so that they are interposed between projections 19 of the opposite membrane 13 wherein clearances between side surfaces of said projections 19 form blood flow chambers 14. Inside the connected membranes 13 there are formed gas-flow chambers 15. The polymer layer on each membrane 13 is always facing the blood-flow chambers 14. Sealing of chambers 14 and 15 is effected by means of a sealing member 20. The inlet pipe 9 for venous blood and the inlet gas pipe 11 and the outlet gas pipe 12 are provided at the base 21 of the blood oxygenator.

Figure 4:
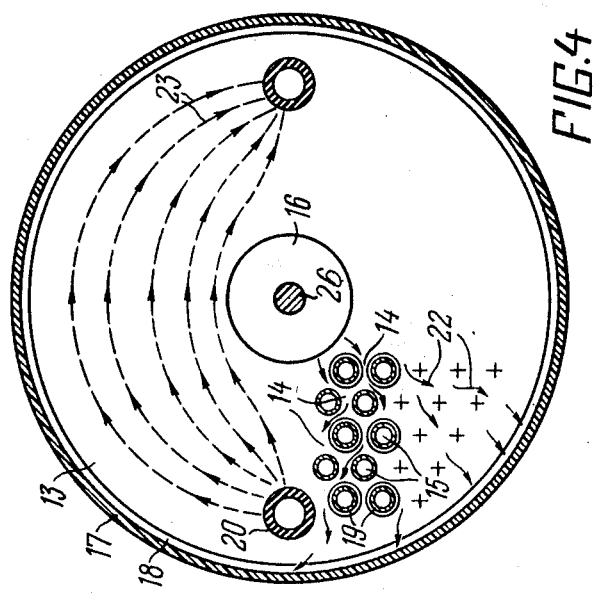
FIG. 4 is a cross-section along the line IV—IV in FIG. 3.

Shown in FIG. 4 is a view from top of the blood oxygenator along the cross-section IV—IV shown in FIG. 3. Demonstrated is the cross-section of a portion of projections 19 of membranes 13. The blood flow direction is shown by solid arrows 22 (on a part of the membrane), while the gas flow direction is shown by dotted lines 23 (conventionally for a half of the gas-flow chamber).

Figure 5:
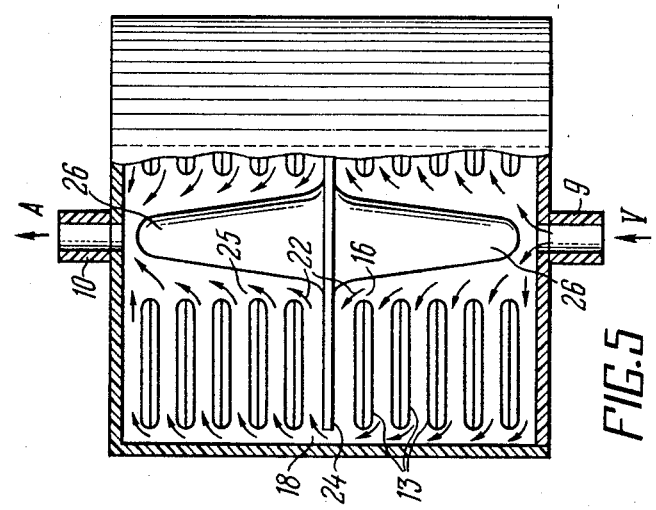
FIG. 5—side view of the blood oxygenator shown in FIG. 3.

Shown in FIG. 5 is a side view of the blood oxygenator demonstrated in FIG. 3. It is seen from the drawing that in the central manifold 16, approximately at half of its length, a tight partition 24 is provided with its outside diameter equal to the outside diameter of membranes 13 (shown without projections). The parts of the central manifold positioned on both sides of the partition 24 are communicating by means of the peripheral annual manifold 18, while the function of the outlet blood-flow manifold is performed by the part 25 of the central manifold positioned behind the partition 24 in the direction of the blood flow. On both sides of the partition 24 there are provided displacing members 26 for reducing the blood volume in the oxygenator and a ensuring a uniform distribution of blood in the blood-flow chambers.

The oxygenator shown in FIG. 2 operates in the following manner.

In operation of the oxygenator, on one side of the membrane 6 (on the side of the continuous polymer layer 1) blood flows, while on the other side gas is supplied. Venous blood "V" passing into the chamber 7 of the oxygenator through the inlet pipe 9 has a partial pressure of carbon dioxide of from 50 to 65 mm Hg and saturation with oxygen of 65–70%. Into the chamber 8 through the inlet pipe 11 pure oxygen is fed into the oxygenator. In this manner on the gas-permeable membrane 6 a gradient of partial pressure of carbon dioxide is obtained equal to 50–65 mm Hg and directed from the blood-flow chamber 7 to the gas-flow chamber 8. Towards the opposite side the gradient of partial pressure of oxygen is directed equal to approximately 700 mm Hg. Due to these gradients of partial pressures, through the membrane 6 counter-current flows of carbon dioxide (from blood to gas) and oxygen (from gas to blood) move. In FIGS. 1 and 2 these flows are shown in dot-and-dash arrows. The venous blood "V" fed into the oxygenator is in contact with the continuous layer 1 of the membrane is in contact with the continuous layer 1 of the membrane 6. Owing to the prevailing gradient of partial pressure of carbon dioxide between the venous blood in the blood-flow chamber 7 and pure oxygen in the gas-flow chamber 8, carbon dioxide penetrates through the thin continuous polymer layer 1 (FIGS. 1 and 2), then through the polymer (filling 4) partly filling pores 3 of the substrate 2 into open pores 3 of the substrate 2. From open pores 3 carbon dioxide passes into the gas-flow chamber 8 and, by means of the flow of oxygen, is withdrawn into the ambient medium through the outlet pipe 12.

The gradient of partial pressure of oxygen directed to the opposite side ensures a backward, relative to the same path, flow of oxygen which arterializes the thin film of blood directly contacting the continuous polymer layer 1.

The thin polymer layer 1 of the membrane 6 makes it possible to pass a substantial flow rate of gas through the unit gas-exchange surface area and thus reduce the gas-exchanging area and filling volume. Upon the blood movement along the gas-permeable membrane a portion of carbon dioxide is removed therefrom to a partial pressure of 35 to 40 mm Hg and saturation of blood with oxygen is increased to 92-98%. This arterialized blood "A" is discharged from the blood oxygenator through the outlet pipe 10 and can be delivered to a patient.

In the laminar flow of blood with strain elemental blood jets, a further gas-exchange process is sloweddown. This is due to the fact that erythrocytes performing the gas-transportation function of blood are suspended in the blood plasma which possesses a high diffusion resistance hindering the gas exchange. Therefore, the flows of carbon dioxide and oxygen during the blood arterialization must pass not only through the gas-permeable membrane 6, but through an ever growing thickness of the arterialized blood.

It should be noted that blood upon its movement in the blood-flow chamber 7 contacts only the continuous polymer layer 1 based on an organosilicon rubber which has a good biological compatibility with blood. This results in a minimum detrimental effect of such oxygenator on blood proteins and its elements.

Since the reinforcing substrate 2 of the membrane 6 is made of a solid material, the gas-permeable membrane has a sufficiently high rigidity, thus ensuring unchanged size of the blood-flow chamber 7 under pressures of up to 700 mm Hg.

The operation of a simple-type blood oxygenator has been described hereinabove to more fully demonstrate the function of the membrane shown in FIG. 1. FIGS. 3, 4 and 5 show the arrangement of a blood oxygenator which is more convenient in operation; this oxygenator is also based on the gas-permeable membrane according to the present invention.

The blood oxygenator shown in FIGS. 3, 4 and 5 operates in the following manner. The venous blood "V" is supplied into the blood oxygenator through the inlet pipe 9 and passes into the central inlet manifold 16 of the blood flow, wherein a displacing member 26 is provided. From the inlet manifold the blood is uniformly distributed between the blood-flow chambers 14. The venous blood is in contact with the continuous polymer layer of gas-permeable membranes 13. From the blood layer directly adjacent to the membranes 13 carbon dioxide penetrates into the gas-flow chambers 15, while oxygen arterializing the blood film is moving in the opposite direction. During further movement of blood in chambers 14 of blood flow the blood flows round the projections 19, wherefore the arterialized blood film passes inside the blood flow and venous blood supersedes it and, in this manner, gets arterialized too. Therefore, during the laminar blood flow the blood is continuously intermixing as shown in the drawing by arrows 22 and this intensifies the gas-exchange process. Uniformity of blood distribution in the blood-flow chambers 14 is ensured at the account of equal height of projections 19 and, consequently, by the same size of the blood-flow chambers 14.

Blood, having passed a part of the blood-flow chambers 14, penetrates into the peripheral manifold 18, wherefrom it is uniformly distributed between the remaining chambers 14 of the blood flow, wherein a further arterialization of blood takes place, and then is discharged from the outlet blood-flow manifold 25; as the latter a part of the central manifold acts which is located after the partition 24 along the blood flow path. From the oxygenator the arterialized blood is discharged through the outlet pipe 10.

Oxygen is admitted into the blood oxygenator through the inlet pipe 11 and uniformly distributed in all chambers 15 of the gas flow. During its movement through these chambers carbon dioxide penetrates into the oxygen stream through the gas-permeable membranes 13 from the venous blood, while a portion of oxygen passes into the blood in the opposite direction. The residual amount of oxygen together with carbon dioxide is discharged into the ambient medium through the outlet pipe 12.

The blood oxygenator embodied according to FIGS. 3, 4 and 5 on the basis of the gas-permeable membrane according to the present invention ensures oxygenation of 6 l/min of blood at a gas-exchange surface area of about 4 $m^2$ and the volume of filling with donor's blood of about 0.5 liter. The pressure in the blood-flow chambers can be safely increased up to 700 mm Hg, since the gas-permeable membrane has a reinforcing substrate of a solid material, thus ensuring the membrane rigidity.

At the same time, the best known currently employed oxygenators have a gas-exchange surface area over 6 $m^2$ and the blood filling volume of 1.2 liter; they permit pressure increase only to 300 mm Hg.

INDUSTRIAL APPLICABILITY

The gas-permeable membranes according to the present invention can be used in diverse gas-exchange devices, for example in breathing apparatus for divers. However, the most preferable use of the gas-permeable membrane according to the present invention is in blood oxygenators which constitute the principal functional organ of an artificial blood circulation apparatus.

We claim:
1. A gas-permeable membrane comprising:
   a reinforcing substrate having over about 10% open-pore content and an average pore size of from about 1 μm to about 1.5 μm; said pores having a rough inner surface and a variable cross-section; and
   a continuous polymeric layer having a thickness of from about 2 μm to about 5 μm consisting essentially of organosilicone rubber applied to one surface of said substrate; said layer extending into the pores in said one surface of said substrate to partially fill said pores with said organosilicone rubber to a depth of between about 8 μm to about 12 μm, thereby providing a durable bond between said layer and said substrate, wherein the depth of fill of said partially filled pores is between about 5% and about 8% of the thickness of the substrate, and said substrate having a gas permeability greater than 100 times the permeability of said polymeric layer.

2. The membrane of claim 1 wherein the substrate is ethyl cellulose.

3. The gas-permeable membrane of claim 1 wherein said continuous polymer layer remains continuous and resists separation from said substrate under a gas pressure of at least up to about 100 cm Hg applied to a second surface of said substrate, wherein said second surface is opposite the one surface onto which said polymer layer has been applied.

4. The gas-permable membrane of claim 1 wherein the continuous polymeric layer is applied to the one surface of said substrate by spraying thereon a solution having a concentration thereof of from about 1 to about 20% by weight in a solvent which is inert with respect to the substrate and which is capable of wetting said substrate, said substrate having been previously heated to a temperature of from between about 0.5° to about 20° C. above the boiling point of said solvent, whereby the solvent evaporates and said pores along said one surface of said substrate are partially filled with said organosilicone rubber to a depth of from between about 8 μm to about 12 μm, thereby providing said durably bonded continuous polymeric layer.

5. The membrane of claim 1 wherein the reinforcing substrate is a sintered metal powder.

6. The membrane of claim 5 wherein the metal is nickel and the reinforcing substrate has greater than 20% open-pore content.

7. A membrane blood oxygenator comprising:
a housing partitioned by means of the gas-permeable membrane of claim 1 into a blood-flow chamber and a gas-flow chamber and means providing flows of blood and an oxygen-containing gas, respectively, through said chambers.

8. The blood oxygenator of claim 7 comprising:
a plurality of said gas-permeable membranes, said membranes being disc-shaped and being positioned so that adjacent pairs thereof are spaced apart, each pair defining one said gas-flow chamber therebetween, all of said gas flow chambers being in flow communication with each other, each membrane having a central opening, and each of said paired membranes being connected along their peripheries and along the circumferences of their central openings, said membranes separating alternating blood-flow chambers from gas-flow chambers, each of the membranes of each said membrane pair having similar surfaces with outwardly extending projections with projections on adjacent paired membranes facing each other, said projections interposed between opposite projections and extending into the spaces between the opposite projections and into the blood-flow chambers;
said blood flow providing means including a central blood-flow inlet manifold and a peripheral outlet blood-flow manifold; and
said gas flow providing means including inlet and outlet gas-flow manifolds;
wherein the layer of polymer on each membrane of each said pair is located on the external surfaces on which projections are positioned, and said projections ensure constant size of the blood-flow chambers,
wherein clearances are present between the side faces of the projections permitting blood flow therearound, and
wherein the central openings of the membranes are interconnected in pairs defining said central inlet manifold and said blood outlet manifolds.

9. The blood oxygenator of claim 8 wherein the central manifold has mounted thereon a tight partition separating the oxygenator into first and second oxygenator sections, said central blood flow inlet manifold supplying blood to said central manifold in said first oxygenator section and said peripheral outlet blood flow manifold in said first oxygenator section supplying blood to a peripheral inlet blood flow manifold in said second oxygenator section from which blood flows through the blood flow chambers defined by the paired membrane projections and flows out of a central blood flow outlet manifold in said second oxygenator section wherein the first and second oxygenator sections each have parts of the central manifold located on respective first and second sides of the partition which are in communication by means of an annular peripheral manifold which provides blood flow means between said peripheral outlet blood flow manifold in said first oxygenator section and said peripheral inlet blood flow manifold in said second oxygenator section.

10. The blood oxygenator of claim 9 wherein the central manifold has displacing members, capable of reducing the volume of blood required in the oxygenator and of uniformly distributing blood in the blood-flow chambers, in said first and second oxygenator sections.

* * * * *